United States Patent [19]
Ford

[11] 3,834,490
[45] Sept. 10, 1974

[54] STEP ARRANGEMENT
[76] Inventor: Robert B. Ford, 8834 E. Naomi Ave., San Gabriel, Calif. 91775
[22] Filed: May 31, 1973
[21] Appl. No.: 365,536

[52] U.S. Cl. ................................................. 182/88
[51] Int. Cl. ............................................ E06c 5/04
[58] Field of Search .................... 182/88, 90, 95, 96

[56] References Cited
UNITED STATES PATENTS

| | | |
|---|---|---|
| 2,142,949 | 1/1939 | Linker .................................. 182/88 |
| 2,458,618 | 1/1949 | McDonald ............................ 182/88 |
| 2,809,849 | 10/1957 | Benne .................................. 182/88 |
| 3,291,255 | 12/1966 | Glatfelter ............................. 182/88 |
| 3,645,557 | 2/1972 | Aldropp ............................... 182/88 |

*Primary Examiner*—Reinaldo P. Machado
*Attorney, Agent, or Firm*—Leonard S. Sauer

[57] ABSTRACT

A foldable and retractable heavy duty set of steps is described wherein sheer loading on pivot points is relieved to provide special structural strength for unusual loading conditions.

4 Claims, 6 Drawing Figures

STEP ARRANGEMENT

BACKGROUND OF THE INVENTION

The instant invention relates to a plurality of foldable steps mounted on a substantially rectangular frame which is retractable into a compact housing attached to the understructure of a wheeled vehicle or the like.

Emphasis is placed on the characteristics described which lend to the rigidity of the steps when in the functional position.

The general uses for the steps are in industrial applications where heavy loading may be expected but will also provide greater safety for recreational vehicles wherein the prior art describes lighter and less reliable means for providing the same facility.

A search of the prior art reveals a number of patents relating to the specific purpose of the instant invention. Listed in order of assumed importance they are: U.S. Pat. No. 3,645,557 wherein two foldable steps are described which are retractable into a rigidly mounted housing in somewhat the same manner as described hereinafter. The distinguishing features claimed herein in light of this patent relates to its simpler operation and to its novel structure to provide rigidity both in lateral and vertical loading.

Other U.S. Pats. are: Nos. 2,575,615; 2,544,799; 3,488,066; 3,008,533; 3,172,499; 3,494,634; 2,941,483; 3,515,406. None of which describe the basic elements of this invention.

SUMMARY OF THE INVENTION

A compact, conveniently operative multi-step arrangement is described which is readily mountable on a vehicle understructure, either bumper or frame, in a manner so that ground clearance is not impaired when the steps are in a retracted or stored position. The invention is highlighted by a simple two-step operation to remove them from the storage position and unfold them for use and the rugged construction which provides added vertical and lateral strength to the structure when in use.

DESCRIPTION OF THE PREFERRED EMBODIMENT

Figure 1:
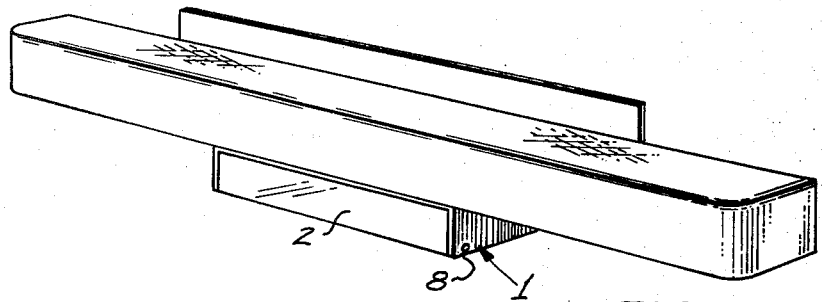
FIG. 1 is an elevational view of a commercial type bumper mounted on a pickup truck with the step mounted thereon in the folded or stored position.
Figure 2:
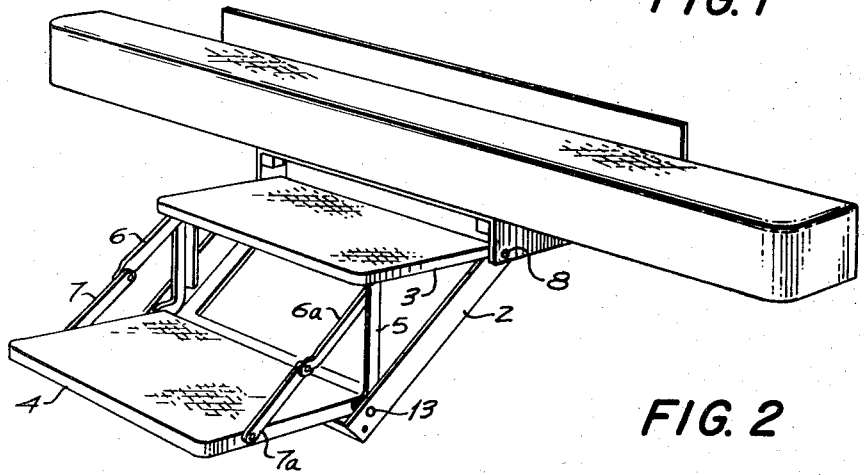
FIG. 2 is a view as described above with the steps unfolded for use.

Reference is directed to FIGS. 1 and 2. A heavy duty industrial type truck bumper is shown with a drawer-like substantially rectangular housing 1 mounted to the underside and slidably mounted within the housing is a substantially rectangular frame member 2 shown in the retracted or stored position. A latch 8 maintains the frame within the housing. FIG. 2 shows the frame 2 removed from the housing and dropped to a 45° angle allowing the steps 3 and 4 to be folded outwardly for use.

Figure 3:
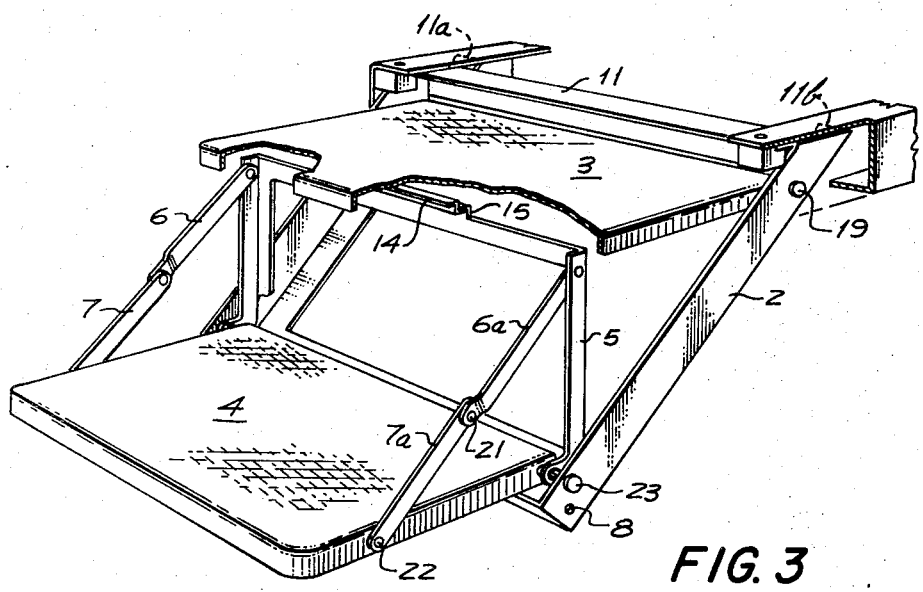
FIG. 3 is a partial sectional view of the steps unfolded detailing structure and strength members.

Reference is directed to FIG. 3. The outer end of the housing 1 is sectioned to show the inner ends of the frame sides 11a and 11b. The sides are formed like angle iron members. The inner ends are cut at a 45° angle to the plane of the housing so that when extended therefrom a broadened force-bearing surface is formed so as to lend added strength as shown more clearly in FIG. 4. The member 11 is a length of angle iron forming the back side of the frame 2 being rigidly attached to the frame sides. The sides of the angle iron 11 is mounted at a 45° angle to the plane of the frame thus providing a solid bar to latch into a pair of stops 9 and 9a attached to the outer upper surface of the housing. A bar member 10 rigidly attached to the outer ends of the frame sides 11a and 11b forms the outer end of the frame 2.

The upper step 3 is pivotally mounted by a rod 19 to the frame 2 adjacent to the inner end thereof and the lower step 4 is pivotally mounted by rod 23 adjacent to the outer end of the frame 2.

A frame-like riser 5 is pivotally mounted by one of its sides to the frame 2 by the pivotal means 23 in a manner so that it folds down into the frame below the step 3.

A pair of elongated folding members 6 and 6a are pivotally attached by one of their ends to each side of the riser 5 adjacent to the upper structure.

A second pair of folding members 7 and 7a similar to said first pair are foldably attached by one of their ends to the extending ends of members 6 and 6a and their other ends attached to the outer sides of step 4 near the extending end.

An elongated latching member 14 is rigidly attached to the outer undersurface of step 3 and adapted to receive the upper surface of the riser 5.

Figure 4:
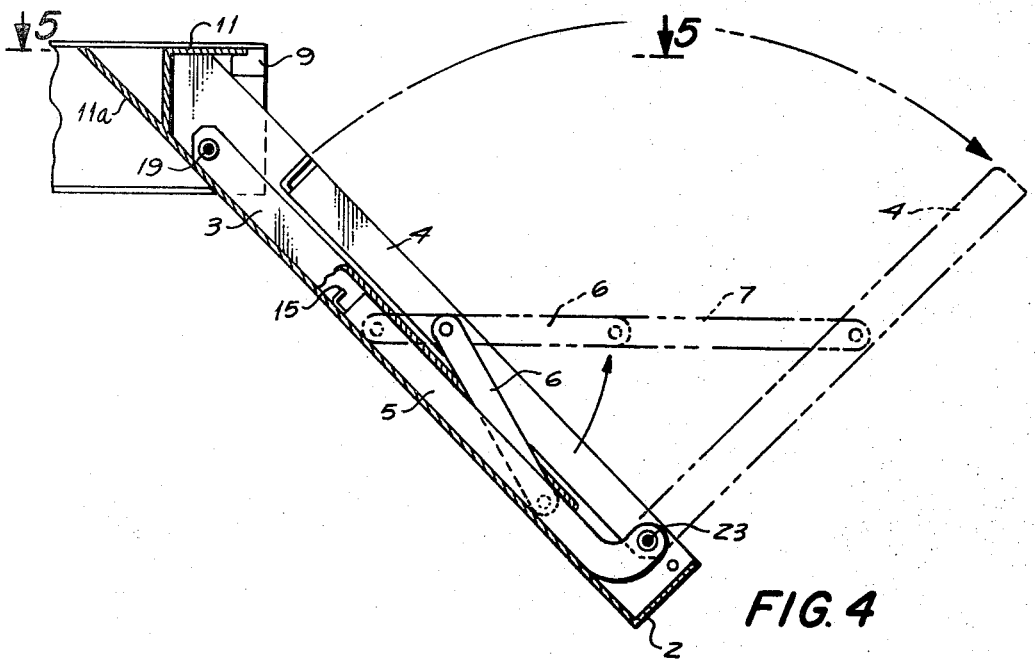
FIG. 4 is a side view of the frame and housing detailing the folding action of the steps.
Figure 5:
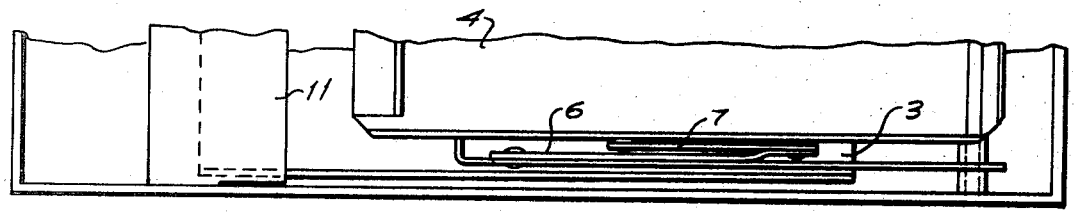
FIG. 5 is a top view detailing the folding action.
Figure 6:
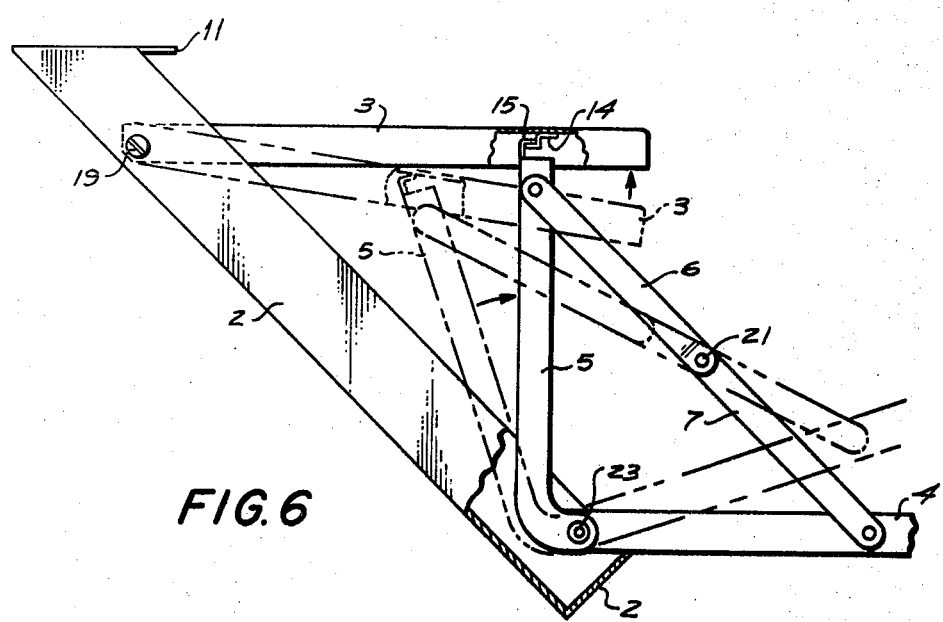
FIG. 6 is a side view detailing the latching means as the steps unfold and the relation of the load bearing members.

Reference is directed to FIGS. 4, 5 and 6. The operational features of the invention are disclosed in these figures. The frame 2 is shown removed from the housing 1 and latched in place for use. Attention is directed to the side member 11a extending inward and upward to contact the upper surface of the housing thus providing extra-strength to the contalevering of the frame. The stop member 9 attached to the housing receives the angle iron 11 to lock the frame in the extended position as the outer end of the frame is dropped to a 45° angle.

The step 4 is lifted out of the frame 2 extending the folded members 6 and 7. The riser 5 is then lifted pushing the step 3 out of the frame to a horizontal position where the latching members 14 and 15 located on the step 3 and the riser 5, respectively, latch the steps into position for use.

What is claimed is:

1. An improved step arrangement comprising:
   A. a substantially rectangular housing open on one side to receive a slidably mounted frame therein;
   B. a substantially rectangular frame adapted to be slidably mounted in said housing;
   C. a plurality of rectangular step members foldably mounted on said frame; and
   D. a rectangular riser member pivotally mounted adjacent to the outer end of said frame and foldably attached to said outermost step in a manner so as to lift and support said inner step when the step arrangement is extended for use.

2. An improved step arrangement as described in claim 1 wherein said frame is formed of four elongated angle iron members, three of which are joined to form a U-shaped open frame with vertical sides and the fourth member attached to the free ends in a manner so as to provide a surface 45° to the vertical on the fourth side of said frame.

3. An improved step arrangement as described in claim 1 wherein said inner step is pivotally mounted by one of its sides adjacent to the inner end of said frame and adapted to fold into the lower portion of said frame while said outer step is similarly pivotally mounted adjacent to the outer end of said frame and adapted to fold into the upper portion of said frame.

4. An improved step arrangement as described in claim 1 wherein said riser member is pivotally mounted on the same mounting means as said outer step and adapted to fold under said inner step, a folding arrangement pivotably attached to said riser and said outer step provides means for lifting and supporting said inner step when said outer step is lifted from said frame.

* * * * *